US012756339B2

(12) United States Patent
Gubba Ravikumar et al.

(10) Patent No.: US 12,756,339 B2
(45) **Date of Patent: *Oct. 6, 2026**

(54) SYNTHETIC GENERATOR SYNCHRONIZATION

(71) Applicant: Google LLC, Mountain View, CA (US)

(72) Inventors: Krishnanjan Gubba Ravikumar, Ashburn, VA (US); Angad Sandhu, Reno, NV (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/084,698

(22) Filed: Mar. 19, 2025

(65) Prior Publication Data

US 2025/0253786 A1 Aug. 7, 2025

Related U.S. Application Data

(63) Continuation of application No. 17/817,535, filed on Aug. 4, 2022, now Pat. No. 12,278,590.

(51) Int. Cl.

| | |
|---|---|
| ***H02P 9/06*** | (2006.01) |
| ***H02K 19/16*** | (2006.01) |
| ***H02K 19/38*** | (2006.01) |

(52) U.S. Cl.

CPC ............... *H02P 9/06* (2013.01); *H02K 19/16* (2013.01); *H02K 19/38* (2013.01)

(58) Field of Classification Search

CPC ............. H02P 9/06; H02P 19/16; H02P 19/38

See application file for complete search history.

(56) References Cited

U.S. PATENT DOCUMENTS

| | | | | |
|---|---|---|---|---|
| 4,031,407 | A | 6/1977 | Reed | |
| 4,218,625 | A | 8/1980 | Beckwith et al. | |
| 6,915,186 | B2 | 7/2005 | Patterson, Jr. | |
| 7,923,853 | B2 | 4/2011 | Lewis | |
| 10,720,866 | B2 | 7/2020 | Blackwelder et al. | |
| 2012/0049638 | A1 | 3/2012 | Dorn et al. | |
| 2013/0073100 | A1* | 3/2013 | Seeley | G01R 19/2513 700/290 |
| 2014/0032138 | A1* | 1/2014 | Shrestha | G01R 31/40 702/58 |

(Continued)

OTHER PUBLICATIONS

Extended European Search Report in European Appln. No. 23175273.4, mailed on Dec. 6, 2023, 7 pages.

(Continued)

*Primary Examiner* — Sean Gugger

(74) *Attorney, Agent, or Firm* — Fish & Richardson P.C.

(57) ABSTRACT

The present disclosure contemplates a method for synchronizing a large number of generators on an AC bus by synchronizing each generator's output to a nominal output that is generated from a common external source. For example, each generator, using a high speed communication signal, can synchronize to a nominal output provided by a master generator, or centralized command module. In another example, each generator can generate its own nominal output referenced to a common external time signal, such as a global positioning system (GPS) signal, or other reference. By synchronizing independently of bus voltage and frequency, the generators are able to synchronize in parallel, instead of serially.

20 Claims, 5 Drawing Sheets

(56) References Cited

U.S. PATENT DOCUMENTS

| | | | | |
|---|---|---|---|---|
| 2017/0214249 | A1* | 7/2017 | Seeley ...................... | H02J 3/44 |
| 2018/0262007 | A1* | 9/2018 | Testi ......................... | H02J 3/30 |
| 2020/0293077 | A1 | 9/2020 | Slota et al. | |

OTHER PUBLICATIONS

Office Action in European Appln. No. 23175273.4, mailed on Nov. 25, 2025, 5 pages.

* cited by examiner

SYNTHETIC GENERATOR SYNCHRONIZATION

CROSS-REFERENCE TO RELATED APPLICATIONS

This application is a continuation application of and claims the benefit of priority to U.S. application Ser. No. 17/817,535, filed on Aug. 4, 2022, the contents of which are hereby incorporated by reference.

TECHNICAL FIELD

This disclosure generally relates to synchronizing electric machines and other types of energy sources.

BACKGROUND

Synchronous electric machines often generate electrical power at a specific phase and frequency which depends on the speed and position of the prime mover of the electric machine. When closing a breaker between two alternating current (AC) electrical systems, if the phase, voltage, and frequency aren't synchronized, then large current surges and damage to components and equipment can occur. Conventionally, when two or more generators are to operate in parallel, a first generator is brought online to supply the AC bus. The second generator is then synchronized to the AC bus and, once synchronized, a breaker between the second generator and the AC bus can be closed. Additional generators can then be synchronized and added to the bus, one by one, until enough generators are online to supply the required load. Once enough generators are online, a main breaker, or supply breaker can be closed to energize loads.

SUMMARY

In general, the disclosure involves systems and methods for synchronizing a synchronous generator with other power sources. Synchronization is performed by mechanically rotating the synchronous generator at a predetermined rotational speed. An external clock signal is received by a protective relay that controls the synchronous generator. The protective relay then generates a target generator output representing a nominal output voltage, nominal output frequency, and nominal output phase based on the external clock signal. A voltage command is sent to an excitation control system to adjust an output voltage of the synchronous generator. A speed command is sent to a mechanical control system to change the rotational speed of the synchronous generator and adjust an output frequency and an output phase of the synchronous generator. The protective relay transmits a synchronized signal indicating the synchronous generator is synchronized when the output voltage, frequency, and phase of the synchronous generator are matched with the nominal voltage, frequency and phase. Once a predetermined number of synchronized signals from other synchronous generators have been received, and the synchronized signal has been transmitted, a breaker associated with the synchronous generator is closed, causing the synchronous generator to energize a bus simultaneously with the other synchronous generators.

Implementations can optionally include one or more of the following features.

In some implementations, the external clock signal is an IRIG-B signal that is generated based on a GPS timestamp. In some implementations, the external clock signal is generated by a protective relay of a particular one of the other synchronous generators.

In some implementations, the predetermined number of synchronized signals is determined by estimating an amount of power demand required, and determining the number of synchronized signals required to ensure sufficient power generation to meet the estimated power demand.

In some implementations, the output voltage, output frequency, and output phase of the synchronous generator are matched when they are within a predetermined tolerance value of the nominal output voltage, nominal output frequency, and nominal output phase. In some implementations these parameters are considered matched when they are within 10% of the nominal output voltage, frequency, and phase.

In some implementations, adjusting the output frequency includes adjusting a steady state rotational speed of the synchronous generator, and adjusting the output phase includes temporarily adjusting a transient rotational speed of the synchronous generator.

In some implementations, the synchronized signal is transmitted via a high-speed communications network. In some implementations the high-speed communications network is a C37.118 protocol synchrophasor communications network.

Particular embodiments of the subject matter described in this specification can be implemented so as to realize one or more of the following advantages. By synchronizing all generators simultaneously to a "virtual generator" or a nominal output, synchronization can occur regardless of the bus voltage, frequency or phase. Further, each generator in an array of backup generators need not be connected to the same bus. This allows synchronization in parallel as compared to series, resulting in reduced down-time for the electric bus. Further, by having the generators located at the low voltage bus, fewer breaker operations are required prior to a generator supplying power to loads, allowing for faster backup. Additionally, because the synchronization occurs independent of the bus to be powered, synchronization can begin prior to power being totally gone from the bus in the event of a power failure. In other words, the disclosed system can anticipate a power failure, and begin to synchronize generators before the power failure is complete. Thus, the systems and techniques described in this document can reduce or even eliminate the duration of power loss event while preventing large current surges and damage to components and equipment caused by unsynchronized generators. In addition, this can reduce the required physical size, cost, and complexity of short-term backup energy source, which can be significant for space-limited and other environments, e.g., data center environments.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

To describe technical solutions in the implementations of the present specification or in the existing technology more clearly, the following briefly describes the accompanying drawings needed for describing the implementations or the existing technology. The accompanying drawings in the following descriptions merely show some implementations of the present specification, and a person of ordinary skill in the art can still derive other drawings from these accompanying drawings without creative efforts.

Like reference numbers and designations in the various drawings indicate like elements.

DETAILED DESCRIPTION

Figure 1:
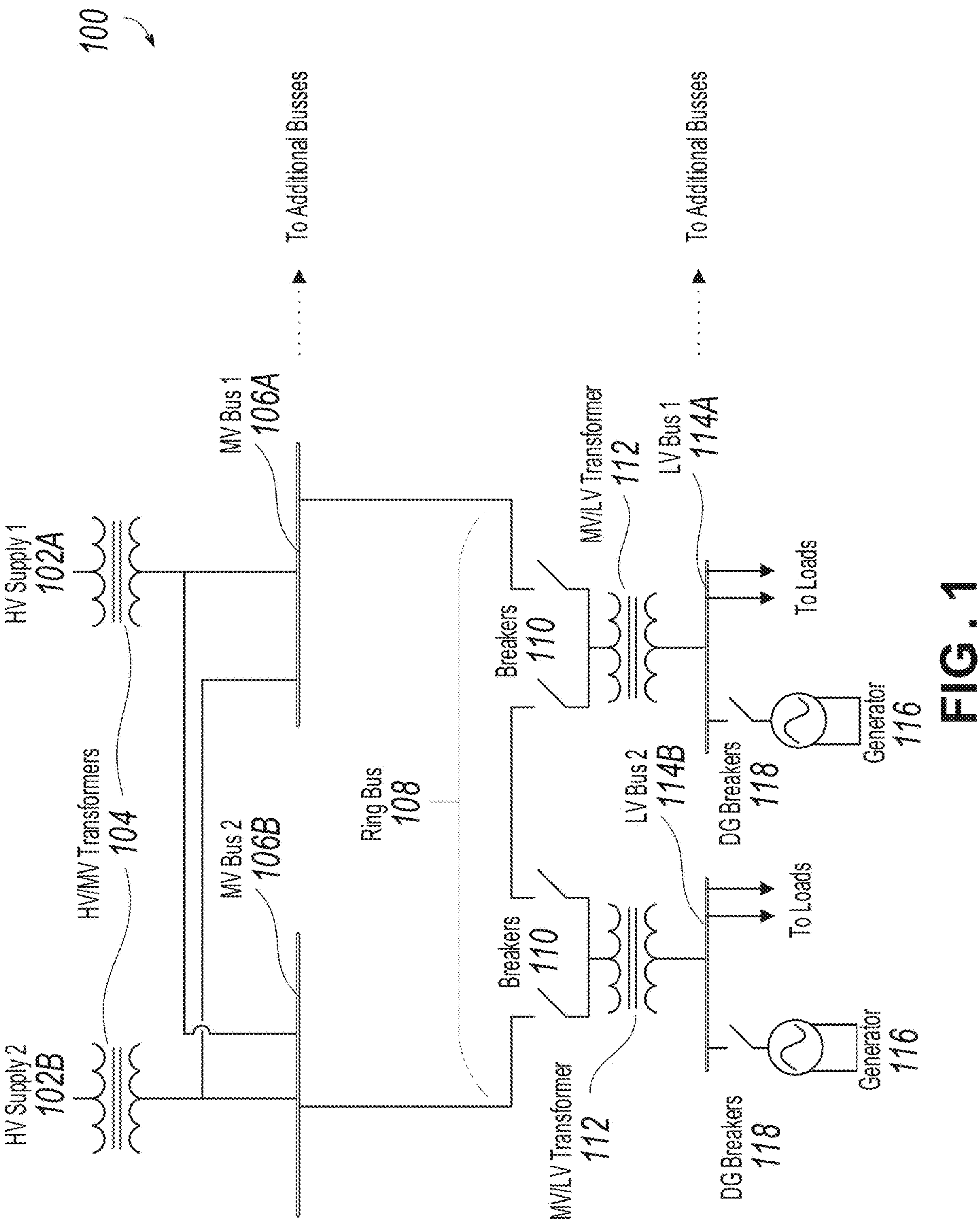
FIG. 1 depicts an example redundant power supply system.

This disclosure describes redundant, reliable power supply systems and techniques for rapidly synchronizing synchronous electric machines to the bus, e.g., in the event of a power failure. Redundant power systems are used to supply critical infrastructure and other systems which require reliable, continuous power. For example, nuclear power plants, datacenters, cooled storage facilities or other installations can require a reliable, continuous power supply. Often two independent external power sources are redundantly routed through a series of buses to ensure that failure of any single component or power source will not result in a loss of power. In addition, local backup generators can be provided to supply power in the event that every external power source is lost. In some implementations, local backup generators need to be brought online and ready to supply power in a very limited period of time (e.g., less than 30 seconds, or less than 15 seconds, etc.) following an external power outage. Many backup generators are alternating current (AC) synchronous machines, which need to operate at the same speed, and in sync with any other generators on the bus, to ensure the bus is supplied with in-phase AC power. Synchronizing a generator, in order to prevent large currents or damage when closing a breaker and bringing the generator on the bus, can be a time consuming process, and is often done sequentially or serially (e.g., one generator at a time), which is too slow for certain applications. As each generator takes time to synchronize to the other active generator(s), sequentially bringing generators onto the bus can take a significant amount time, potentially resulting in long power loss events that extend past the capabilities of short term backup power solutions, e.g., an Uninterruptible Power Supply (UPS).

The present disclosure provides techniques for synchronizing multiple, e.g., a large number of, generators on an AC bus simultaneously by performing synthetic synchronization of the generators. Synthetic synchronization is where each generator synchronizes its output to a nominal output that is provided by a common external source or signal. For example, each generator, using a high speed communication signal sent over a high speed communication network, can synchronize to a nominal output provided by a master generator, or centralized command module. In another example, each generator can create its own nominal output referenced to a common external time signal, such as a global positioning system (GPS) signal (e.g., GPS time), or other reference.

By synchronizing independently of bus voltage and frequency, the generators are able to synchronize in parallel, instead of serially, thereby bringing the generators online to power loads more rapidly. Additionally, by not using the bus as a reference, the generators need not wait for a complete power loss, and an initial breaker operation in order to begin synchronization. Instead, each generator can start up mechanically, and begin synchronizing to a nominal output in anticipation of being connected to the bus prior to power being lost. Synthetic synchronization can be accomplished using precise voltage and speed control of the generator to be synchronized, to allow for minute phase shifts and voltage matching. Synthetic synchronization can also be accomplished with low latency communication between generators, ensuring that all generators are achieving similar output waveforms and coordinating to determine an available amount of in-sync power generation. Once sufficient power generation to supply the bus has been synchronized, the synchronized generators can each be connected to the bus that they supply simultaneously, or near simultaneously (e.g., within milliseconds of each other), to supply loads. The simultaneous connection ensures that no single generator is overloaded by loads on the busses that are supplied, and removes the requirement for a separate generator bank isolation breaker.

To help a person skilled in the art better understand the technical solutions in the present specification, the following clearly and comprehensively describes the technical solutions in the implementations of the present specification with reference to the accompanying drawings in the implementations of the present specification. The described implementations are merely some rather than all of the implementations of the present specification. All other implementations obtained by a person of ordinary skill in the art based on one or more implementations of the present specification without creative efforts shall fall within the protection scope of the implementations of the present specification.

FIG. 1 depicts an example redundant power supply system 100. The illustrated system 100 includes two high voltage (HV) power supplies 102A and 102B, although other quantities of HV power supplies can be used. These HV supplies 102A-B can be provided by a utility, or an external power plant. In some implementations, the HV supplies 102A-B are supplied at 13.8 kV or 22 kV and are provided by a local electrical grid.

High voltage to medium voltage transformers 104 step down the supplied HV energy to a medium voltage (MV) which can be, for example, 12.7 kV or 6.6 kV, amongst other voltages. These high voltage to medium voltage transformers 104 each independently supply power two or more MV buses (106A and 106B). This redundant connection allows for a single HV supply (e.g., HV supply 2 102B) to power both (or all) MV buses. While only two MV buses are illustrated (106A and 106B), additional MV buses are possible. For example, a data center might employ sixteen separate MV buses, each redundantly supplied by two or more HV power supplies.

A ring bus 108 is used to supply power to two or more low voltage (LV) buses (114A and 114B). Other types of buses can be used to supply the LV buses. In the illustrated implementation, four breakers 110 are provided to connect either MV bus 1 106A, MV bus 2 106B, or both to each of the MV to LV transformers 112 although other quantities of breakers can be used. The breakers 110 can be configured to independently allow the MV/LV transformers 112 to be energized from either MV bus (or both). In the event a power failure or imminent power loss is detected on the ring bus 108 or either of the MV buses 106A or 106B, the breakers 110 can be opened to rapidly isolate the LV buses (114A and 114B) either from both MV buses 106A and 106B or a single MV bus 106A or 106B. Power failure or imminent power loss can be determined based on fluctuating voltage or frequency on the HV supplies (102A or 102B), or based on other anticipated events (e.g., planned shutdowns for maintenance). In some implementations, a machine learning algorithm monitors parameters on the HV supplies (102A and 102B) and predicts a likelihood of power loss. MV/LV Transformers 112 can be bi-directional transformers, allowing power flow both ways. In this manner, a generator 116 on one LV bus (e.g., LV bus 114B) can supply power to other LV buses through the MV/LV transformers 112.

The MV/LV transformers 112 can step voltage down from the MV busses (106 and/or 108) to, for example 600V or 480V in order to supply loads. Additionally one or more backup generators 116 can be connected to the LV buses 114A and 114B. By connecting the backup generators 116 directly to the LV buses 114A and 114B, there is no need for a centralized backup bus, with its own isolation breakers that would need to operate in the event of a power loss. In some implementations, a single generator 116 is connected to each LV bus 114, and there are a total of sixteen LV buses, with eight total ring buses being supplied from sixteen MV buses. In another implementation, eight ring buses are supplied from eight MV buses, supplying sixteen LV buses. Other combinations and configurations of redundant power supply systems are considered within the scope of this disclosure.

Some emergency backup systems can connect backup generators to the MV buses (e.g., MV bus 1 106A and MV bus 2 106B) or the ring bus 108 via a separate backup bus and breaker system. In the illustrated implementations, the generators 116 are directly connected to the LV buses 114A and 114B via DG breakers 118. This is advantageous in that additional breaker operations (e.g., between the backup bus and the MV buses, as well as breakers 110) are not required to supply power to the LV buses 114A and 114B. An additional advantage is that if it is determined that a power outage is likely based on measured transients at either the HV supply or the MV buses, breakers 110 can be immediately opened, rapidly de-energizing the LV buses 114A and 114B, and allowing DG breakers 118 to be closed quickly, and in some instances, before power is totally gone from the MV buses 106A and 106B. This can enable faster switching to backup power, without the need to wait for the MV buses 106A and 106B to drop to low voltage before connecting a backup generator. Further, with synthetic synchronization, the generators 116 can begin synchronizing while power still exists on the LV busses (114A and 114B). One difficulty with placing the backup generators 116 on the LV busses 114A and 114B is that, by connecting them to separate buses, a single bus voltage, frequency, and phase may not be readily available to synchronize the each of the remotely located generators 116. Therefore, the generators 116 may have to rely on an external reference voltage, frequency, and phase with which to synchronize.

In some implementations, additional backup power sources that are not synchronous machines are also available. For example, a backup battery can supply buses via an inverter, or hydrogen fuel cells can be used to provide emergency backup power. In these implementations, the non-synchronous power sources can also perform synthetic synchronization, aligning themselves with the nominal output based on the same external reference as the synchronous machines.

In some instances, during a power loss event, or prior to an anticipated power loss, the generators 116 are started, and begin synchronization with the DG breakers 118 open. In some implementations, each generator 116 receives an external timing signal (e.g., IRIG-B signal originating from a GPS satellite) and generates a nominal output waveform based on the external timing signal. For example, a nominal waveform can be a 60 Hz, 480V, AC sinusoid, with the phase angle of each phase referenced to a specific time within the external timing signal (e.g., peak amplitude for phase A is at 0.00 ms, while peak amplitude for phase B is at 5.53 ms). The electrical startup of the generators 116 can be rapidly performed according to methods described in greater detail below with respect to FIGS. 3 and 4. Once a generator 116 is synthetically synchronized, its associated DG breaker 118 can be opened or closed without regard to specific timing, as it is assured that the generator 116 is providing the same (or similar, e.g., within a specified tolerance) output as the remaining generators 116 in the system 100.

Figure 2:
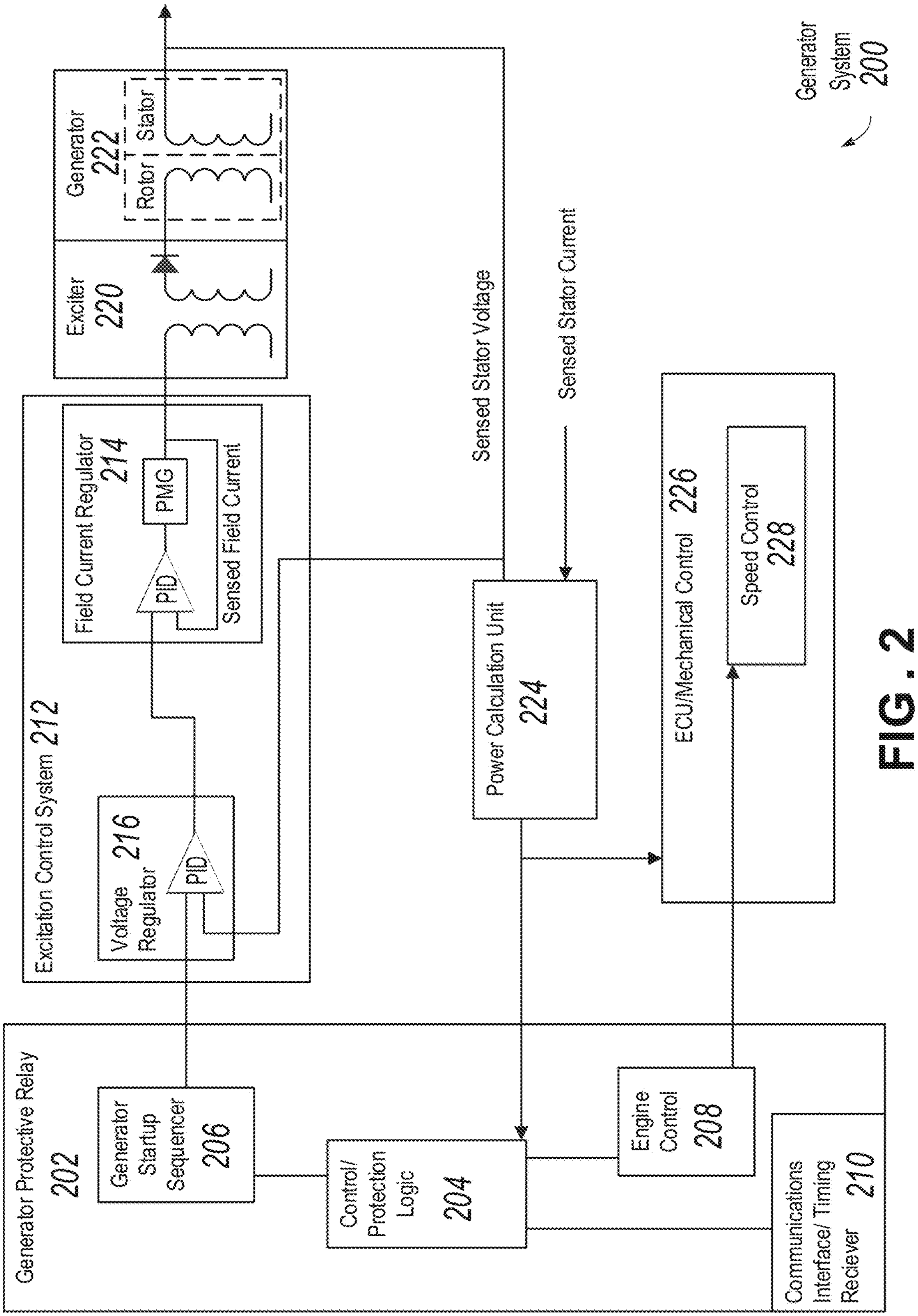
FIG. 2 is a block diagram illustrating a generator control system.

FIG. 2 is a block diagram illustrating an example generator system 200. The generator system 200 includes a protective relay 202, an excitation control system 212, engine control unit (ECU) and mechanical control system 226 and an exciter 220 and generator 222. The generator 222 includes rotor windings and stator windings.

The protective relay 202 can be a high level controller for the generator, responsible for ensuring the generator 222 is protected from an overpower, over-voltage, and/or overspeed condition, among other things as well as controlling startup and some operation of the generator 222. The protective relay 202 includes control and protection logic 204 which receives a generator power calculation from a power calculation unit 224 and other operating parameters and determines whether the generator 222 is in a safe condition based on the generator power and other operating parameters. The control and protection logic 204 is configured to send an isolate command to trip the associated breaker and isolate the generator 222 from an electrical system to which the generator 222 is connected whenever a dangerous condition occurs. This can protect either the bus to which the generator 222 is connected and/or the generator 222 itself.

The protective relay 202 includes an engine control module 208, which interacts with (e.g., by sending commands to and receiving commands from) the ECU and mechanical control system 226 of an engine portion of the generator 222. The ECU and mechanical control system 226 regulates the speed of the prime mover using a speed control module 228. In synchronous applications, the rotational speed of the prime mover drives the output frequency of the generator 222. For example, a 3 pole pair synchronous generator rotates at 1200 revolutions per minute to generate 60 Hz AC power. In another example, a 5 pole pair synchronous generator provides 50 Hz AC power when rotating at 600 revolutions per minute (RPM). The engine control module 208 can send signals to the speed control module 228 to adjust engine speed in order to achieve a desired frequency. In some implementations, phase can be adjusted by inducing a temporary change in speed. For example, if the nominal frequency is 60 Hz, which is associated with a 1200 RPM rotational speed, then a temporary slowdown to 1199 RPM can cause the phase angle of the generator output to lag until a target phase angle is reached. Similarly, a temporary speed up (e.g., 1205 RPM, or 1201 RPM, etc.) can cause the phase angle to lead, when the target phase angle is achieved the speed can then be reduced to nominal (e.g., 1200 RPM).

Protective relay 202 includes a communications interface 210. The communications interface 210 is used by the generator system 200 for communicating with other systems in a distributed environment. For example, communications interface 210 can report the electrical or mechanical status of the generator system 200 to a central control hub, or to other generator systems operating their own protective relays. In some implementations, the communications interface 210 includes a dedicated timing receiver, configured to receive precision timing signals (e.g., IRIG-B signals) in order to perform synchronized timing operations. Additionally, the communications interface 210 can report a current output voltage, frequency, and phase if appropriate. In instances where there are an array of generators, the relays 202 for each generator communicate in real-time or near real-time (e.g., within seconds, milliseconds or shorter). Generally, the communications interface 210 includes logic encoded in software and/or hardware in a suitable combination and operable to communicate with a network and other components. More specifically, the interface 210 can include software supporting one or more communication protocols associated with communications such that the protective relay 202 is operable to communicate physical signals within and outside of the illustrated system 200. In some implementations, a standard synchrophasor measurement and communications protocol is used, such as IEEE C37.118. In some implementations, the communications interface 210 communicates using serial or Ethernet-based communications with IEC 61850 Edition 2, EtherNet/IP, the IEEE 1588 Precision Time Protocol (PTP), IEC 60870-5-103, the IEC 62439 Parallel Redundancy Protocol (PRP), Mirrored Bits communications, Modbus, DNP3, and other protocols. The communication interface 210 can be communicably coupled to respective communication interfaces of other generator systems using an appropriate physical layer that includes one or more conductors. In some implementations, the protective relay is an SEL-700G series relay, or other suitable device.

The startup sequencer 206 includes logic for performing the generator startup (e.g., operators for starting the generator 222) with the excitation control system 212. Startup sequencer 206 will send a target voltage signal to the excitation control system 212, which uses a permanent magnet generator, a field current regulator 214, and a sensed stator voltage to achieve the target output voltage. As illustrated, excitation control system 212 includes a pair of series connected, closed loop controllers, a voltage regulator 216, which measures output voltage and drives voltage to the desired output, and a field current regulator 214, which measures field current, and maintains a target field current based on the output of the voltage regulator 216. It should be noted that while proportional-integral-derivative (PID) controllers and feedback loops are illustrated, other suitable control schemes for regulating voltage and/or field current can be used and are considered within the scope of this disclosure. For example, a state space control algorithm utilizing a Kalman filter, a fuzzy logic control algorithm, or other modern control algorithm can be used.

In some implementations, and as discussed in further detail below with respect to FIGS. 3 and 4, the backup generator can be electrically started up, with the protective relay 202 controlling both speed using the ECU or mechanical control module 226 and the speed control system 228 in order to establish a target frequency, and phase. The protective relay 202 can further control the excitation control system 212 to establish a target voltage. The target voltage, frequency, and phase is can be generated by the control/protection logic 204 based on an external timing signal received via the communications interface 210. Once a generator is synchronized with its nominal or target output, the protective relay 202 can coordinate with other generators in the system (e.g., system 100 as described with reference to FIG. 1) and a total available power output can be determined. If the total available power output is sufficient to supply the required loads, the generators can simultaneously shut breakers (e.g., DG breakers 118 as discussed with reference to FIG. 1) and energize the bus (e.g., LV busses 114A and 114B of FIG. 1).

Figure 3:
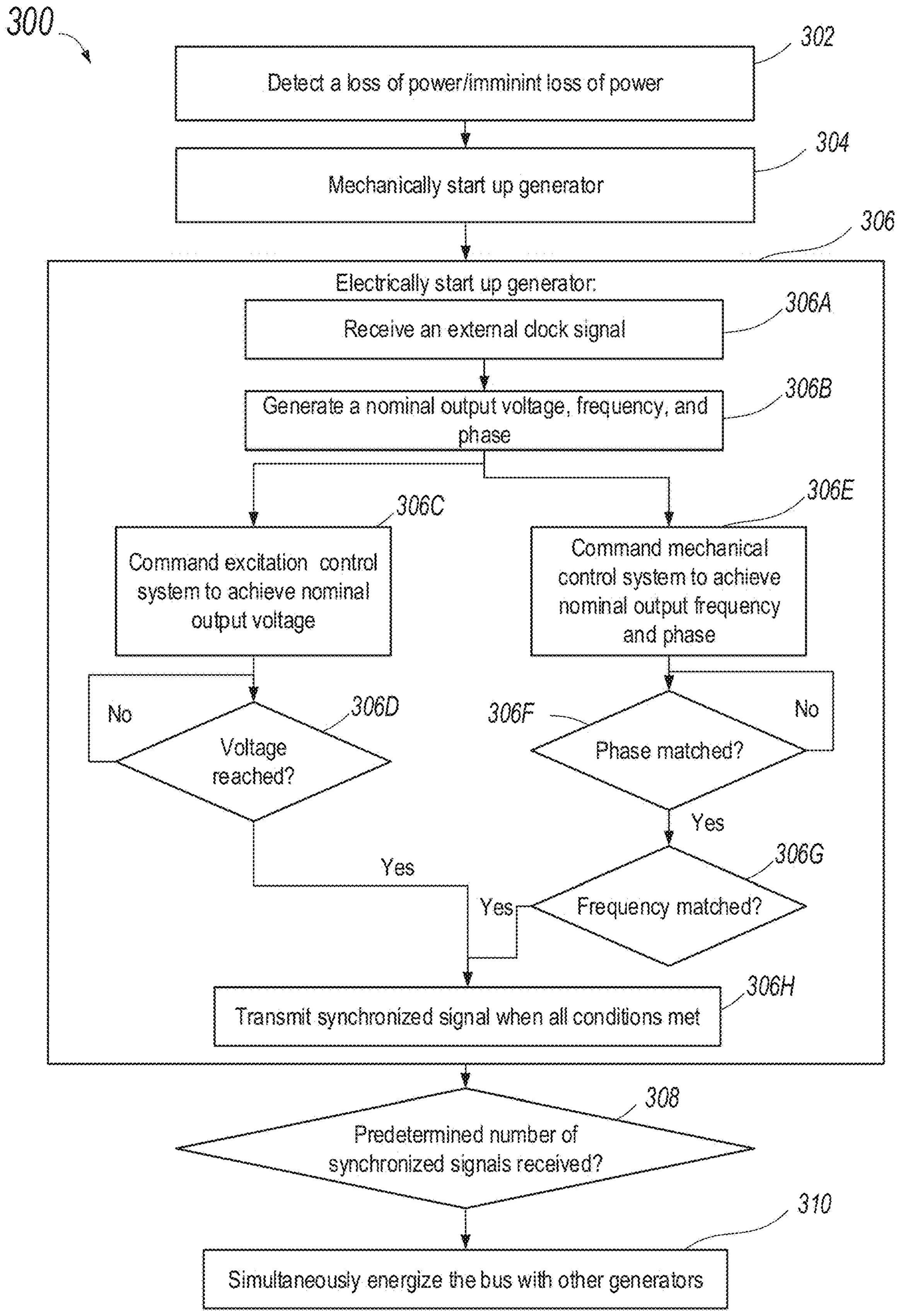
FIG. 3 depicts a flowchart illustrating an example method for synthetic synchronization.

FIG. 3 depicts a flowchart illustrating an example process 300 for synchronizing parallel generators. FIG. 3 generally shows process 300 for performing a startup of a backup generator such as generator 116 in a reliable power architecture, such as the one described with respect to FIG. 1. Process 300 can be executed by, for example, generator system 200 of FIG. 2.

At 302, a loss of power, or imminent loss of power is detected at a bus supplying power to one or more loads. In some instances, power loss can be anticipated. For example, if certain transients are detected on an HV supply bus, (e.g., HV supply 2 102B as described in FIG. 1) then it can be determined that a power loss is likely. In some instances, predicting a power loss prior to actual loss of power can allow early startup and synchronization of backup generators, increasing the overall availability of power. In another example, a trip signal is emitted from a utility substation, indicating imminent power loss. In some instances, frequency, and rate of change of frequency can be monitored, and likely power loss can be determined if rate of change of frequency increases beyond a predetermined threshold (e.g., 2 Hz/sec, 0.5 Hz/sec or other appropriate threshold).

At 304, a set of backup generators for supplying loads are mechanically started, and accelerated to operational speed (e.g., 1200 RPM, 3600 RPM, 720 RPM, 600 RPM, or other speed according to the design and configuration of the generator). In some implementations, the backup generators run at 1500 RPM. In some implementations, they run at 900 RPM. This can be triggered by a startup command, based on a detected power outage, or a signal or sensor predicting an imminent power outage.

At 306, the generators are started up electrically and synchronized. An external clock signal is received (306A) by, for example, a protective relay controlling the generator. The external clock signal can be an IRIG-B signal, a timing signal provided by a master clock, or a timing signal provided by another generator.

The external timing signal is used to generate a nominal output voltage, frequency and phase (306B) for a “virtual” generator. The generator will attempt to sync to this “virtual” generator, causing its outputs to match. Because each generator in the system uses the same external timing signal, they will each generate the same nominal output, and therefore be synchronized because they are each matching the same nominal signal. For example, the external timing signal can set a reference ensuring each generator’s clock is synchronized precisely. Further, a particular time in the external timing signal can be used for referencing phase angle on each generator. For example, phase angle for each output phase can be measured from a whole second (e.g., 1.0000 seconds) or a whole tenth of a second. This allows multiple generators at potentially remote locations from each other to synchronize not only voltage and frequency, but also phase, allowing breaker operations without causing large inrush currents/voltages.

Once a nominal output voltage, frequency, and phase are determined, the protective relay can command an excitation control system to achieve that determined nominal output voltage (306C). Simultaneously, or contemporaneously, the protective relay can command a mechanical control system to achieve the nominal output frequency and phase (306E). The relay can then monitor to determine if the generator has reached the target output voltage (306D). The relay further determines whether the mechanical control system has established a matching phase with the nominal phase (306F). If phase is not matched, the generator can be temporarily sped up, or slowed down in order to match the phase. In some implementations, "matching" simply means that the phase is within a predetermined margin of error selected to minimize inrush current during breaker operations. For example, "matching" may mean within 10%, or 5% or other value. Once phase, voltage and frequency (306G) are matched, the relay can transmit a "synchronized" signal (306H) to other generators or relays in the system. The synchronized signal indicates to other generators in the system that the present generator is synchronized and ready to supply power.

At 308, the synchronous generator can also receive "synchronized" signals from other generators. Once a predetermined number of synchronized signals are received, it can be determined that there is sufficient power generation capability in the system (e.g., system 100 of FIG. 1) to supply loads that will come online when the bus(es) are energized. In some implementations the predetermined number of synchronized signals is a fixed number (e.g., when 9 of 16 generators are synchronized). In some implementations, it is determined based on the pre-shutdown loading. For example, where prior to the power loss the bus(es) were consuming 2 MW of power, the predetermined number can be the number of generators required to produce at least 2 MW, or 2 MW and some additional margin (e.g., 2.5 MW).

At 310, because the predetermined number of synchronized signals has been received, the generator will connect to the bus (e.g., by closing DG breaker 118) in order to simultaneously energize the bus with other backup generators. While waiting to achieve the predetermined number of synchronized signals, the generator will maintain the proper voltage, frequency, and phase. In some implementations, the generators automatically close their breaker as soon as the predetermined number is met. In other implementations, once the predetermined number is satisfied, a command module, or master generator sends a connection command to the remaining generators, to ensure that they are all connected to the bus nearly simultaneously, and thus no single generator is overloaded.

Figure 4:
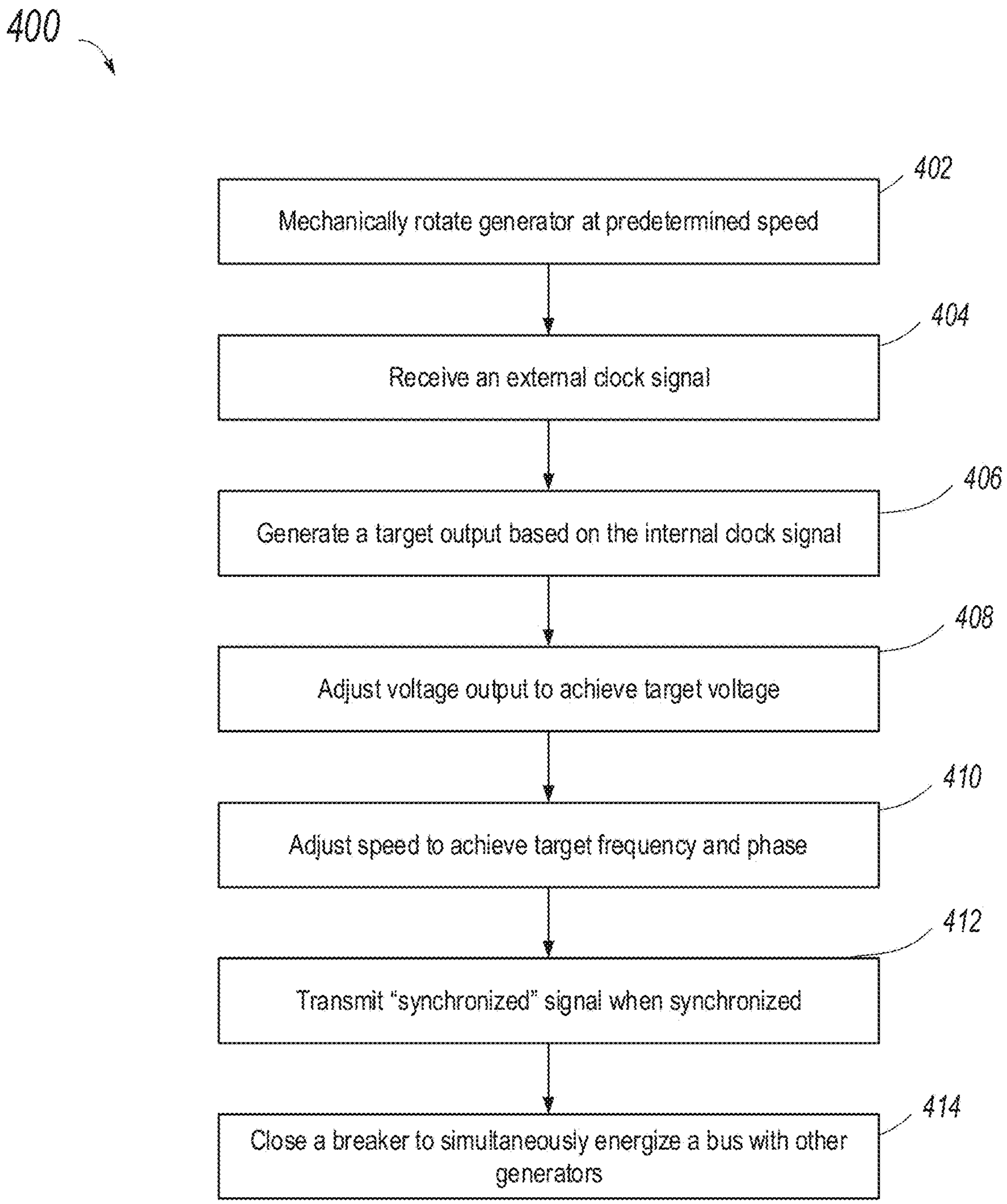
FIG. 4 is a flowchart illustrating an example method of performing a startup of two or more synchronous machines.

FIG. 4 is a flowchart illustrating an example process 400 of performing a startup of two or more synchronous machines. The synchronous machines can be, for example, the generators 116 of FIG. 1, and can be controlled by, for example, the system 200 as described with respect to FIG. 2.

At 402 the backup generators are mechanically started, and rotated at a predetermined speed. In some implementations, the predetermined speed, which can be determined based on the configuration of the generator and desired output frequency, is 3600 RPM.

At 404, an external clock signal is received at a protective relay of the backup generator. The external clock signal can be an IRIG-B signal that is generated based on a GPS timestamp, a timing signal provided by a master clock, or a timing signal provided by another generator.

At 406, a nominal output, or target generator output is determined based on the clock signal. The target generator output includes a target or nominal output voltage, nominal output frequency, and a nominal output phase. In some implementations the target generator output is selected based on a desired frequency and voltage (e.g., 480V at 60 Hz) and a phase angle referenced on the external clock signal.

At 408, a voltage command signal is sent from the protective relay to an excitation control system in order to adjust an output voltage of the generator to achieve the target output voltage.

At 410, a speed command signal is sent to a mechanical control system to change the rotational speed of the synchronous generator, adjusting an output frequency and an output phase of the synchronous generator, in order to achieve the target output frequency and target output phase.

At 412, when the generator output has achieved the target voltage, frequency, and phase, the protective relay transmits a synchronized signal indicating that the generator is synchronized. In some implementations, the generator output is considered to have achieved the target voltage, frequency, and phase when the generator output is within a predetermined tolerance value.

At 414, when a predetermined number of synchronized signals from other synchronous generators have been received, and the generator itself is synchronized, a breaker associated with the synchronous generator is closed, causing the synchronous generator to energize a bus simultaneously with the other synchronous generators.

Figure 5:
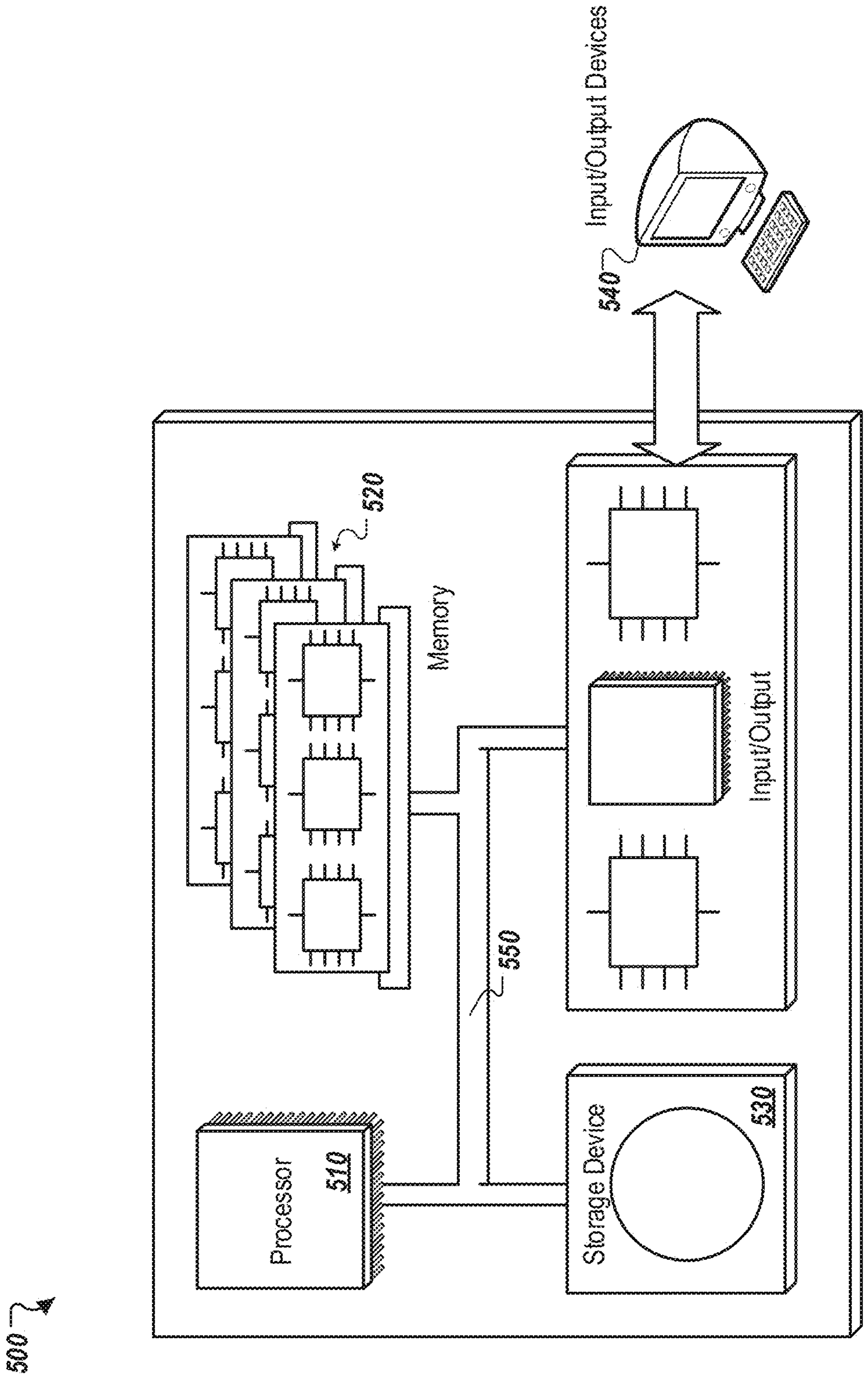
FIG. 5 is a schematic diagram of a computer system.

FIG. 5 is a schematic diagram of a computer system. The system 500 can be used to carry out the operations described in association with any of the methods described previously, according to some implementations. For example, system 500 can perform operations associated with process 300 of FIG. 3, process 400 of FIG. 4, or operations associated with certain elements as described in FIG. 2 (e.g., protective relay 202). In some implementations, computing systems and devices and the functional operations described in this specification can be implemented in digital electronic circuitry, in tangibly-embodied computer software or firmware, in computer hardware, including the structures disclosed in this specification (e.g., system 500) and their structural equivalents, or in combinations of one or more of them. The system 500 is intended to include various forms of digital computers, such as laptops, desktops, workstations, personal digital assistants, servers, blade servers, mainframes, and other appropriate computers, including vehicles installed on base units or pod units of modular vehicles. The system 500 can also include mobile devices, such as personal digital assistants, cellular telephones, smartphones, and similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device, such as a CRT (cathode ray tube) or LCD (liquid crystal display) monitor for displaying information to the user and a keyboard and a pointing device, such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A method for synchronizing a synchronous generator with other synchronous generators, the method comprising:

obtaining a value representing a number of additional synchronous generators that would be required to supply sufficient power to a bus connected to one or more loads;

receiving an external clock signal;

determining, based on the external clock signal, a target output phase for the bus;

controlling the synchronous generator to generate an output having the target output phase, a target output voltage, and a target output frequency;

receiving synchronized signals from at least a portion of the other synchronous generators, wherein each respective synchronized signal from the synchronized signals indicates that the other synchronous generator from which the respective synchronized signal is received is synchronized with the target output voltage and target output frequency;

determining that a number of the received synchronized signals meets or exceeds the value; and in response to determining that the number of the received synchronized signals meets or exceeds the value and the synchronous generator being controlled to generate the output having the target output phase, the target output voltage, and the target output frequency, closing a breaker associated with the synchronous generator to cause the synchronous generator to energize the bus simultaneously with the other synchronous generators.

2. The method of claim 1, wherein obtaining the value comprises:

monitoring parameters of at least one power supply connected to the bus; and generating, by a trained machine learning model and based on the parameters, a predicted likelihood of power loss for the at least one power supply.

3. The method of claim 2, further comprising:

in response to determining the predicted likelihood of power loss for the at least one power supply, opening one or both of (i) the breaker associated with the synchronous generator, or (ii) another breaker associated at least a subset of the other synchronous generators.

4. The method of claim 1, wherein obtaining the value comprises estimating an amount of power demand required by the bus.

5. The method of claim 1, wherein the bus is a ring bus comprising one or more additional breakers coupled to the breaker associated with the synchronous generator, the one or more additional breakers configured to supply one or more low-voltage buses.

6. The method of claim 1, wherein at least one of (i) the synchronous generator, or (ii) a particular synchronous generator from the other synchronous generators, is connected to another breaker associated with a diesel generator.

7. The method of claim 1, wherein the bus is coupled to at least one additional power source configured to supply power to the bus.

8. The method of claim 7, further comprising synchronizing voltages of the at least one additional power source to the target output voltage and synchronizing output frequencies of the at least one additional power source to the target output frequency.

9. The method of claim 1, further comprising:

in response to receiving the external clock signal, generating a respective nominal output waveform based on the external clock signal for each of (i) the generator, and (ii) the other synchronous generators, wherein the respective nominal output waveform is generated according to the target output voltage and the target output frequency.

10. The method of claim 1, wherein:

the obtained value is generated by a power calculation unit for the synchronous generator, the external clock signal is received by a protective relay configured to control the synchronous generator, and the protective relay comprises an engine control module configured to adjust an initial speed of an engine for the synchronous generator to a target speed associated with the target output frequency.

11. A system comprising:

a communications network; and a plurality of synchronous generators communicably coupled to each other by way of the communications network and for powering one or more loads, each synchronous generator comprising a controller configured to perform operations for synchronizing synchronous generator with other synchronous generators of the plurality synchronous of generators, the operations comprising:

obtaining a value representing a number of additional synchronous generators that would be required to supply sufficient power to a bus connected to one or more loads;

receiving an external clock signal;

determining, based on the external clock signal, a target output phase for the bus;

controlling the synchronous generator to generate an output having the target output phase, a target output voltage, and a target output frequency;

receiving synchronized signals from at least a portion of the other synchronous generators, wherein each respective synchronized signal from the synchronized signals indicates that the other synchronous generator from which the respective synchronized signal is received is synchronized with the target output voltage and target output frequency;

determining that a number of the received synchronized signals meets or exceeds the value; and in response to determining that the number of the received synchronized signals meets or exceeds the value and the synchronous generator being controlled to generate the output having the target output phase, the target output voltage, and the target output frequency, closing a breaker associated with the synchronous generator to cause the synchronous generator to energize the bus simultaneously with the other synchronous generators.

12. The system of claim 11, wherein obtaining the value comprises:

monitoring parameters of at least one power supply connected to the bus; and generating, by a trained machine learning model and based on the parameters, a predicted likelihood of power loss for the at least one power supply.

13. The system of claim 12, the operations further comprising:

in response to determining the predicted likelihood of power loss for the at least one power supply, opening one or both (i) a breaker associated with the synchronous generator, or (ii) another breaker associated with at least a subset of the other synchronous generators.

14. The system of claim 11, wherein obtaining the value comprises estimating an amount of power demand required by the bus.

15. The system of claim 11, wherein the bus is a ring bus comprising one or more additional breakers coupled to the breaker associated with the synchronous generator, the one or more additional breakers configured to supply one or more low-voltage buses.

16. The system of claim 11, wherein at least one of (i) the synchronous generator, or (ii) a particular synchronous generator from the other synchronous generators, is connected to another breaker associated with a diesel generator.

17. The system of claim 11, wherein the bus is coupled to at least one additional power source configured to supply power to the bus.

18. The system of claim 17, the operations further comprising synchronizing voltages of the at least one additional power source to the target output voltage and synchronizing output frequencies of the at least one additional power source to the target output frequency.

19. The system of claim 11, the operations further comprising:

in response to receiving the external clock signal, generating a respective nominal output waveform based on the external clock signal for each of (i) the generator, and (ii) the other synchronous generators, wherein the respective nominal output waveform is generated according to the target output voltage and the target output frequency.

20. A non-transitory computer-readable storage medium coupled to one or more processors and having instructions stored thereon which, when executed by the one or more processors, cause the one or more processors to perform operations for performing synchronization of a synchronous generator with other synchronous generators, the operations comprising:

obtaining a value representing a number of additional synchronous generators that would be required to supply sufficient power to a bus connected to one or more loads;

receiving an external clock signal;

determining, based on the external clock signal, a target output phase for the bus;

controlling the synchronous generator to generate an output having the target output phase, a target output voltage, and a target output frequency;

receiving synchronized signals from at least a portion of the other synchronous generators, wherein each respective synchronized signal from the synchronized signals indicates that the other synchronous generator from which the respective synchronized signal is received is synchronized with the target output voltage and target output frequency;

determining that a number of the received synchronized signals meets or exceeds the value; and in response to determining that the number of the received synchronized signals meets or exceeds the value and the synchronous generator being controlled to generate the output having the target output phase, the target output voltage, and the target output frequency, closing a breaker associated with the synchronous generator to cause the synchronous generator to energize the bus simultaneously with the other synchronous generators.

* * * * *